Patented Aug. 7, 1928.

1,679,432

UNITED STATES PATENT OFFICE.

CHARLES EDWARD LYON, OF NIAGARA FALLS, NEW YORK, ASSIGNOR TO HOOKER ELECTROCHEMICAL COMPANY, OF NIAGARA FALLS, NEW YORK, A CORPORATION OF NEW YORK.

HEAT-PRODUCING COMPOSITION.

No Drawing. Application filed December 21, 1925. Serial No. 76,892.

The invention relates to heat-producing compositions, and particularly such as are especially suitable for cleaning plugged or frozen drains, traps, sewers and the like, although the composition of the present invention is useful for many other purposes where it is desirable to liberate heat locally without the dangers attending the employment of free flame methods; for example, volatilization of inflammable liquids for fumigation, disinfection, etc.

An object of the invention is to provide a composition which is free from the principal disadvantage of known compositions,—namely the liberation, during reaction, of large quantities of offensive gases, often inflammable and frequently carrying traces of irritating or otherwise offensive caustic.

Another object of the invention is to provide a composition which is capable of producing a higher temperature and yet which acts more gradually than those of its type hitherto known and which is less liable to cause painful injuries.

Other objects and advantages will appear upon a full understanding of the invention.

Briefly, the composition comprises an alkali metal hydroxide and a substance capable of reacting therewith in the presence of water to produce heat without material evolution of gas. Preferably I also employ a substance which serves to control the reaction between the hydroxide and the other reactive component.

As the hydroxide I prefer to employ caustic soda on account of its cheapness and availability, and the flake or the pulverized anhydrous form is quite suitable. The other reactive ingredient of the composition may be any salt which in reacting with the caustic alkali in the presence of water produces a large amount of heat without evolution of gas. In general, I prefer for this purpose the salts of weak bases such as, for instance, the chlorides or sulfates of aluminum, zinc or calcium, aluminum chloride being preferred due to the fact that it is relatively inexpensive and that it reacts with caustic soda vigorously, liberating a relatively large quantity of heat. As the substance used for control of the reaction, I may use sodium chloride or any equivalent material which does not enter into the heat-producing reaction, but which may controllably reduce the intensity thereof. One of the reactive salts may be combined with the control salt before final mixing; thus, the double chloride of aluminum and sodium may be employed instead of the separate chlorides. Certain salts, especially aluminum chloride by themselves tend to produce too strong reactions for some purposes, but the reaction rate can readily be controlled by means of the non-reactive ingredient, and the rate at which the heat is liberated thus controlled.

The composition and the manner of its preparation will better be understood from the following examples:

(1) 10 parts by weight of a dry mixture of aluminum chloride and sodium chloride in desired proportions, for instance equimolecular proportions, are mixed with about ninety parts by weight of ground caustic soda. The mixture is packed dry in airtight and moisture-proof tins, and is ready for use by the addition of water or by pouring the mixture into the drain or trap containing water or to which water is supplied. By varying the proportion of sodium chloride used with respect to the amount of aluminum chloride the intensity of heat-producing reaction and consequently the intensity of heating can be regulated. The greater is the proportion of sodium chloride in the mixture the slower is the reaction.

(2) Aluminum chloride and sodium chloride in the desired proportion, depending upon the temperature which it is desired to attain, are mixed and heated to from 120° C. to 150° C. according to the ratio of the two salts. The resulting combined salt is then crushed or granulated and mixed in proper proportion with crushed or granulated caustic soda. A mixture of 10 parts by weight of the combined salt containing sodium chloride and aluminum chloride in about equimolecular proportions with 90 parts by weight of sodium hydroxide gives a composition suitable for general use as a drain cleaner. It is noted that the quantity of aluminum chloride in such a mixture is only about one-tenth of that capable of reacting with the sodium hydroxid content of the mixture, and therefore that the mixture contains a large excess of caustic soda which serves as a grease dissolving and cleansing agent. The product is packed in air-tight and moisture-proof tins.

(3) 5 to 10 parts by weight of aluminum chloride are mixed with from 95 to 90 parts by weight of caustic soda. Without the addition of a control salt such a composition is suitable for certain purposes where heating to a high temperature for a relatively short period is desired.

In the use of the compositions of the invention, the higher temperature occurs at the bottom of the reacting mixture, unlike the known prior art, and this is considered to be an important advantage.

My invention is of course capable of certain variations without departing from the spirit thereof, particularly as regards equivalence of materials, proportions and manner of preparation.

I claim:

1. A heat-producing composition comprising an alkali metal hydroxide and a salt decomposable by alkali metal hydroxides with the evolution of heat.

2. A heat-producing composition comprising an alkali metal hydroxide and aluminum chloride.

3. A heat-producing composition comprising sodium hydroxide and aluminum chloride.

4. A heat-producing composition comprising an alkali metal hydroxide, aluminum chloride and a substance serving to control the intensity of the reaction.

5. A heat-producing composition comprising an alkali metal hydroxide, aluminum chloride and a salt of an alkali metal.

6. A heat-producing composition comprising sodium hydroxide, aluminum chloride and sodium chloride.

7. A heat-producing composition comprising sodium hydroxide and sodium aluminum chloride.

8. A heat-producing composition comprising approximately ninety parts by weight of sodium hydroxide and approximately ten parts by weight of sodium aluminum chloride.

9. A heat-producing composition comprising an alkali metal hydroxide, a salt decomposable by alkali metal hydroxides with the evolution of heat, and a salt of an alkali metal.

In testimony whereof, I affix my signature.

CHARLES EDWARD LYON.